US008804157B2

(12) United States Patent
Bockus, Jr. et al.

(10) Patent No.: US 8,804,157 B2
(45) Date of Patent: Aug. 12, 2014

(54) PRINT QUALITY VERIFICATION SYSTEM FOR DETECTING A MISMATCH IN A PRINTED DOCUMENT

(75) Inventors: Gordon Bockus, Jr., Austin, TX (US); Michael Andrew Bockus, Oklahoma City, OK (US); Derek Ryan Brewer, Rochester, MN (US); Robert Dale Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 13/080,710

(22) Filed: Apr. 6, 2011

(65) Prior Publication Data

US 2012/0257917 A1 Oct. 11, 2012

(51) Int. Cl.
*G06K 15/00* (2006.01)
(52) U.S. Cl.
USPC ........ 358/1.14; 358/1.15; 358/1.16; 358/406; 358/474; 358/504; 358/505
(58) Field of Classification Search
CPC ..... G06F 3/121; G06F 3/1235; G06F 3/1285; G06F 3/1234
USPC ................ 358/406, 474, 504–505, 1.14–1.16
See application file for complete search history.

(56) References Cited

U.S. PATENT DOCUMENTS

| | | | |
|---|---|---|---|
| 4,685,139 A * | 8/1987 | Masuda et al. ................ 382/112 |
| 6,078,400 A * | 6/2000 | Mizutani ...................... 358/1.14 |
| 7,190,469 B1 * | 3/2007 | Gomi ........................... 358/1.14 |
| 7,190,470 B2 | 3/2007 | Burquist |
| 7,847,963 B2 | 12/2010 | Sugimoto |
| 8,144,936 B2 * | 3/2012 | Spitzig ......................... 382/112 |
| 2002/0114002 A1 * | 8/2002 | Mitsubori et al. ........... 358/1.15 |
| 2003/0234960 A1 * | 12/2003 | Kaltenbach et al. ........ 358/3.24 |
| 2005/0046889 A1 * | 3/2005 | Braudaway .................. 358/1.14 |
| 2005/0052679 A1 * | 3/2005 | Green et al. ................ 358/1.14 |
| 2006/0152759 A1 | 7/2006 | Chen |

(Continued)

FOREIGN PATENT DOCUMENTS

WO    WO 02/14077 A1 *    2/2002    ............ B41J 29/393

*Primary Examiner* — Benny Q Tieu
*Assistant Examiner* — Quyen V Ngo
(74) *Attorney, Agent, or Firm* — David A. Mims, Jr.; Parashos T. Kalaitzis; Robert V. Wilder

(57) ABSTRACT

A method, programmed medium and system are disclosed which provide for an in-line scanner used to dynamically scan a document or image, real-time as it is being printed within a printer unit and before the printed document exits the printer. The scanned image is compared to a stored electronically-generated image of the file being printed. When the comparison is determinative that there is a printing problem, the printing operation may be stopped quickly before the partially printed document or image has exited the printer. An error message may then be displayed, and the user is enabled to take appropriate action. A resume function enables a user to resume a print job at exactly the place where it had left off before detecting a print problem. In another embodiment, when the system detects a problem with a print job, the entire print job of the remainder of the print job is sent from the faulting printer to another printer where either the remainder of the print job or the entire print job is completed.

16 Claims, 7 Drawing Sheets

(56) References Cited

U.S. PATENT DOCUMENTS

| | | | |
|---|---|---|---|
| 2006/0158703 A1* | 7/2006 | Kisilev et al. | 358/504 |
| 2007/0212143 A1* | 9/2007 | Ohara | 400/62 |
| 2008/0259391 A1* | 10/2008 | Maruo et al. | 358/1.15 |
| 2008/0278735 A1* | 11/2008 | Wang et al. | 358/1.5 |
| 2009/0091783 A1* | 4/2009 | Kazume et al. | 358/1.15 |
| 2010/0188684 A1 | 7/2010 | Kumara | |
| 2010/0245899 A1* | 9/2010 | Hirama | 358/1.15 |
| 2010/0328739 A1* | 12/2010 | Saida | 358/498 |

* cited by examiner

PRINT QUALITY VERIFICATION SYSTEM FOR DETECTING A MISMATCH IN A PRINTED DOCUMENT

FIELD OF THE INVENTION

The present invention relates generally to information processing systems and more particularly to a methodology and implementations for dynamically monitoring printing quality of a printer device.

BACKGROUND OF THE INVENTION

Printing documents and images can be frustrating due to all the problems that may arise during the printing process. For example, if the printer is running low on ink or if the ink head is clogged, there is usually no indication that there is a problem until the entire document or image has completed the printing process. Thus, for example, if a fifty page document file has been sent to a printer, many sheets of paper as well as a relatively large amount of ink could be wasted before it is determined that a printing problem has occurred and the print job needs to be redone.

Most printers now come with utilities to detect low levels of ink and they do display this information as a pop-up depending on the software, but it does not solve the problem of printing documents and having to discard them because the quality is not good enough or parts or colors did not print.

Accordingly, there is a need to provide an improved print quality verification system which is designed to avoid the problems set forth above.

SUMMARY OF THE INVENTION

A method, programmed medium and system are disclosed which provide for an in-line scanner used to dynamically scan a document or image, real-time as it is being printed within a printer unit and before the printed document exits the printer. In an exemplary embodiment, the scanned image is compared to a stored electronically-generated image of the file being printed. When the comparison is determinative that there is a printing problem, the printing operation may be stopped quickly before the partially printed document or image has exited the printer. An error message may then be displayed either on the control panel of the printer or as a pop-up on the connected computer or both and the user is enabled to take appropriate action. The real-time scan and compare saves ink and paper by terminating the printing operation immediately upon the detection of a quality problem thereby saving paper and ink which would otherwise be wasted on an unacceptable print job which would need to be re-printed. The system is also enabled to scan and compare for orientation on labels, checks or other types of paper. For example if checks are being printed, the system gives immediate feedback as to whether the text is printed in the right data field or section of the check. If labels were being printed, the system is enabled to detect orientation problems with the content of each label. A resume function enables a user to resume a print job at exactly the place where it had left off before detecting a print problem. The system also provides for backing up the print job and reprinting only the sections where a print problem, such as streaking or perhaps a color was missing, and continues on with the print job to completion. In another embodiment, when the system detects a problem with a print job, the entire print job of the remainder of the print job is sent from the faulting printer to another printer where either the remainder of the print job or the entire print job is completed. The dynamic in-printer scan and compare function allows the print job to be completed without any wasted paper or ink.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
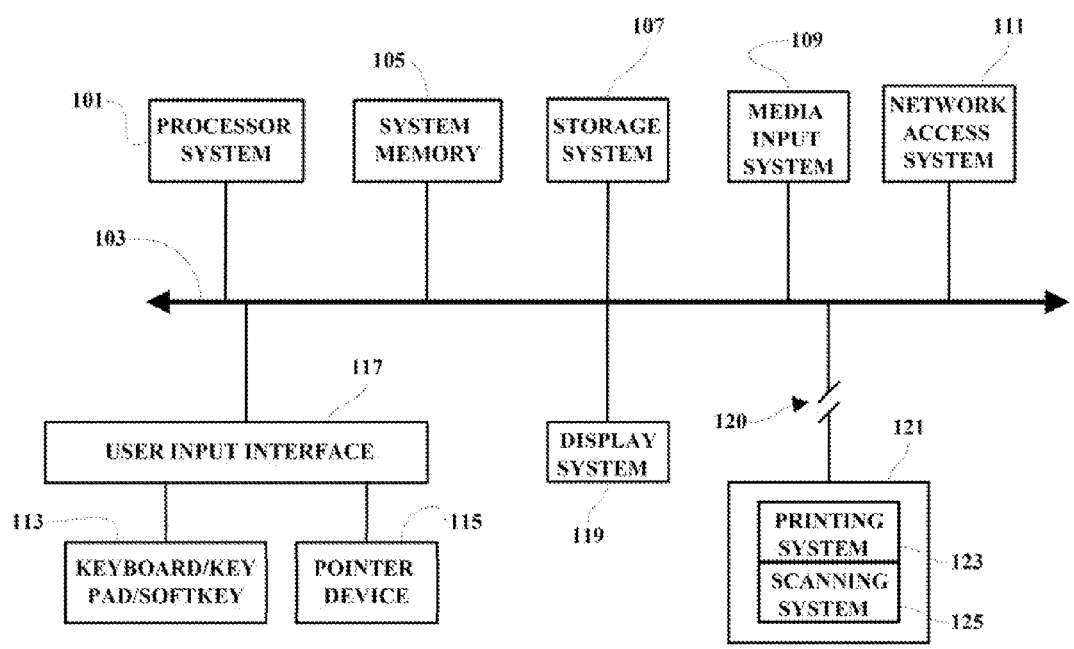
FIG. 1 is an illustration of one embodiment of a system in which the present invention may be implemented.

The various methods discussed herein may be implemented within a computer system which includes, inter alia, processing means, memory, storage means, input means, a printer device and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a personal computer system, it is understood that disclosed methodology may also be applied in a more extensive network system as well as in many other available and future devices and systems such as cell phones and personal wireless and other hand-held devices, including any input device, including touch-sensitive screens or touch-sensitive input pads, to achieve the beneficial functional features described herein.

The disclosed exemplary system describes how an in-line scanner is used to scan the document real-time as it is being printed and compare the scan with what was supposed to be printed. In so doing, when a discrepancy is detected, the system will stop the print job and display a message either on the control panel of the printer or as a pop-up on the connected computer or both. This early detection of printer problems saves both paper and ink by stopping the print job before pages of unacceptable quality pages have been printed. After comparing the scan with the intended output, user corrective actions may be displayed to remedy the problem. For instance, if the output was missing the color red, it would first use it's algorithm to determine the level of red ink remaining and if it was not low, it would recommend a cleaning of the print head. If the output scanned was streaked and missing sections then it would recommend a cleaning or priming of the print head.

The disclosed system takes the normal print process one step further by adding a scanner either right next to the print head or farther down the print path within the printer device itself. As the document is being printed, it is also being scanned directly afterwards. By doing this, the printer has the information about what was supposed to be printed and what was actually printed even before the current page has completed printing. By comparing these, the system can determine and detect various types of basic printer issues and print quality issues such as hue, correct color, missing colors, etc. If a problem is detected, the print job would immediately be halted and a message could be sent to either the printer control panel or the computer connected or both. Such an error message may also selectively be sent via email to a predetermined wireless device so that the user may become aware of the problem and possibly take corrective action using an application running on the user's personal device even after the user has left his workstation. The message back to the user's personal computer (or printer control panel, email etc.) could also selectively contain a picture of the scan that was taken (this won't be visible at the printer since it's typically hard to see what printed until the paper comes out). At this point, the user can continue with the print job and accept the potential problem or choose from a list of potential actions to take to try and remedy the issue. If the action taken was to clean the print heads or replace an ink cartridge, the system could be programmed to back up the print job to a point where the problem was detected and reprint that section along with the rest of the document.

A "print resume" function would not just be a resume of a document after, for example a paper jam, but rather to resume the print job at exactly the place where it had left off before detecting a print problem. Furthermore, the user is able to selectively back up the print job and reprint only the sections where streaking or perhaps a color was missing and continue on with the print job to completion. This would be particularly useful when printing large pictures or photographs.

In another embodiment, the user system is enabled, to choose to have the print job fail-over to a designated back-up printer when a printer problem is detected with the primary printer. In the fail-over mode, the back-up printer would begin to print from the page on which a print problem was first detected. It is here noted that the printer may be located at a remote location and connected to the user's computer through a wired or wireless network connection. The disclosed verification system may also be enabled to use metadata of the assigned print job to gather information about the designated primary printer to determine ahead of time whether the ink levels, available colors, sheets of available paper, etc. of the assigned primary printer are sufficient to complete the entire print job. Once the information is gathered, a warning message could be displayed telling the user that there might not be enough ink to print the document. In this case, the user could either cancel the job, replace the ink cartridge and continue, or go ahead with the print job.

In another embodiment, when a printer is stopped in the middle of a job, pre-defined default actions of what to do when a certain problem occurs with a certain type of document could be presented to the user. For example, if there is a streaking problem in the ink with a draft text document, the system may be programmed to continue instead of stopping. In another example, if the user is printing a photograph, and there is a problem, the default is to stop and wait for input.

Scanning the document real-time inside of the printer as it prints gives immediate feedback of any problems with the quality or intended output of the document by comparing the scan to the intended output. Not only could the system send feedback, but it could also send an image of what was scanned real-time. The verification system allows a user to pause and then continue a print job after a print quality problem has been identified and fixed. This includes cleaning print heads, changing out cartridges, etc.

The system is also enabled to scan and compare for orientation on labels, checks or other types of paper. For example if checks are being printed, the system gives immediate feedback as to whether the text is printed in the right section of the check. If labels were being printed, the system is enabled to detect orientation problems with the content of each label. Given the expense of printed checks and other water-marked papers, the verification system provides significant savings.

With reference to the drawings, FIG. 1 illustrates an exemplary embodiment in which the present invention may be implemented. As shown, a processor system 101, which may include one or more processors, is connected to a main bus 103. The main bus 103 is also coupled to, inter alia, system memory 105, a local storage system 107, a media input system 109, a network access system 111 and a user input interface 117. The user input interface 117 is arranged to receive user inputs from a keyboard or keypad or softkey device 113 or a pointer device 115 such as a mouse. The main bus 103 is also connected to a display system 119. The input and/or display system may also comprise a touch-sensitive screen or optically-sensitive input pad (not shown). The exemplary system illustrated also includes a printer device 121 which may be remotely located 120 from the other system components such that a user is enabled to have jobs printed at printer devices which are remotely located and beyond the view of the user in which case the user is unable to directly or easily verify the quality of the printing. The printer 121 as shown includes a printing system 123 and also a scanning system 125 arranged for scanning the output of the printer 121 inside of the printer and before a printed page exits the printer 121. Additional devices and bus systems are not shown but may also be coupled to the system main bus 103.

Figure 2:
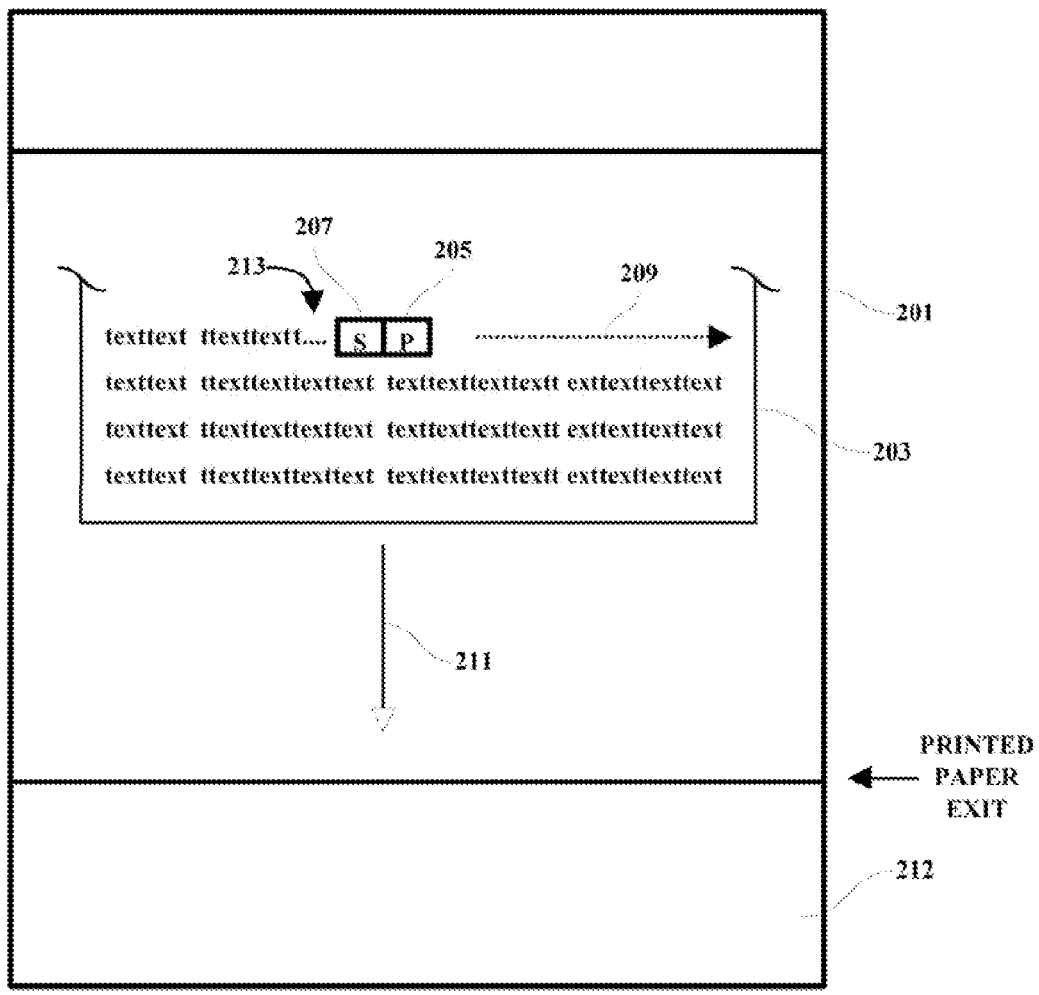
FIG. 2 is an illustration of an exemplary operation of a printer device using the print verification system.

In FIG. 2, there is shown an exemplary printer 201. The printer 201 is shown in the process of printing a page 203 containing text content. It is noted that while text content is used in the example, images and photographs may also be printed using the system herein disclosed. As shown, as a page 203 is being printed, the page continues 211 toward the output of the printer 201 and when a complete page has been printed, the printed page exits the printer 201 to an output tray 212. In the example, the printed page 203 is inside of the printer 201 and not viewable by a user until a complete page has been printed and output to the tray 212. Thus, a user is unable to view the quality of the print job until at least a full page has already been printed.

In the FIG. 2 example, the printer 201 includes a print head 205 and a scanning head 207, both of which may be carried on a common carrier traversing the page 203. After the printing is accomplished by the print head 205, the following scan head 207 scans what has just been printed and is enabled to produce an image of the printed text as it has actually been printed by the print head 205. In this manner, the system is enabled to verify the quality of a print job, real time, as the page is being printed but while the page is still within the printer 201. The timing of the scanning relative to the printing may vary depending on the type of printer and other specifications or information for the printer. In FIG. 2, if the print head 205 and the scan head 207 are carried by a common carrier across the page being printed, the print process and the scan process are continuous as the page is being printed. In other systems, the scan process may be incrementally delayed relative to the print process but in either case, the printing and scanning are completed within a printer and before a printed page 203 exits the printer 201. Thus, when there is a printing discrepancy, perhaps a low ink condition or other print malfunction, the result 213 will appear on the printed page 203 and the scanning process 207 will identify the print discrepancy 213 almost immediately after it appears on the page 203 so that corrective action may be taken before an entire page or, if the printer is remote from the user, an entire print job has been ruined by a printer failure.

Figure 3:
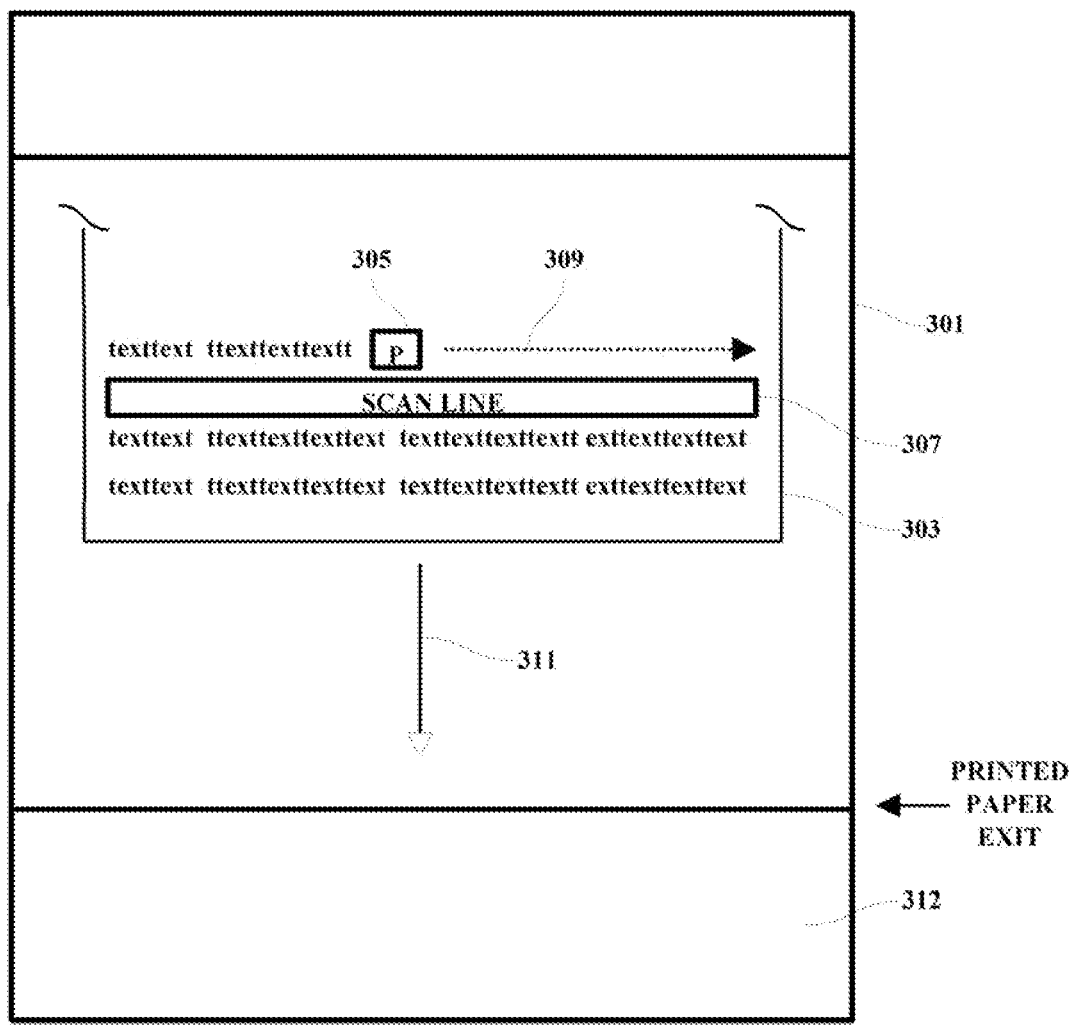
FIG. 3 is an illustration of another exemplary operation of a printer device using the print verification system.

FIG. 3 illustrates another embodiment in which scanning is accomplished one line at a time. As shown, a printer 301 prints text content on a page 303 as the page 303 moves 311 toward the output tray 312. A print head 305 is enabled to move across a page 303 and print text or other page content as the print head moves 309 across the page 303. A scan line 307 is positioned and enabled to scan the printed content of a page 303 being printed one line at a time after each line has been printed. In the FIG. 3 example, the scanning process is not continuous but is initiated only after a complete line has been printed.

Figure 4:
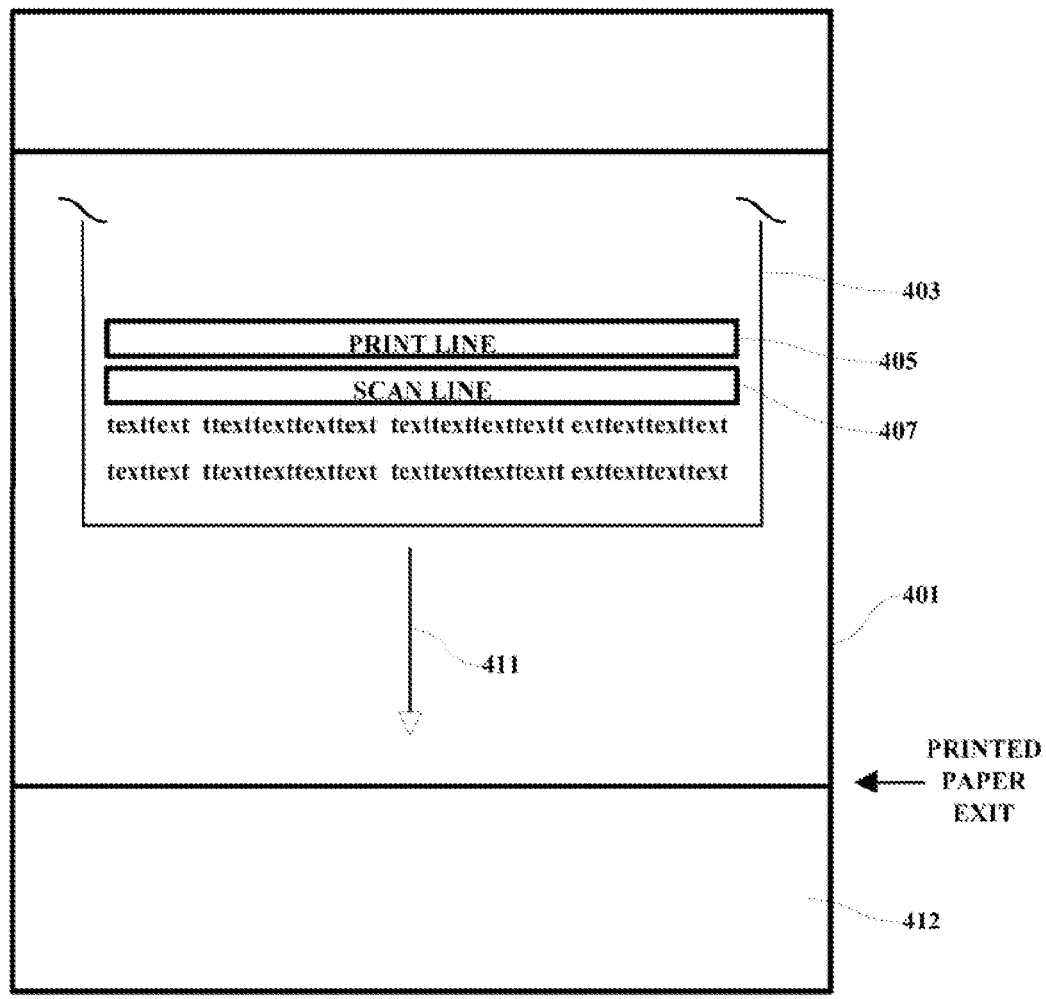
FIG. 4 is an illustration of another exemplary operation of a printer device using the print verification system.

FIG. 4 illustrates another embodiment in which both the printing and scanning are accomplished one line at a time. As shown, a printer 401 prints text content on a page 403 as the page 403 moves 411 toward the output tray 412. A print line 405 is enabled to print a line of text or other content across a page 403. A scan line 407 is positioned and enabled to scan the printed content of a page 403 being printed one line at a time after each line has been printed. In the FIG. 4 example, the scanning process is not continuous but is initiated only after a complete line has been printed.

Figure 5:
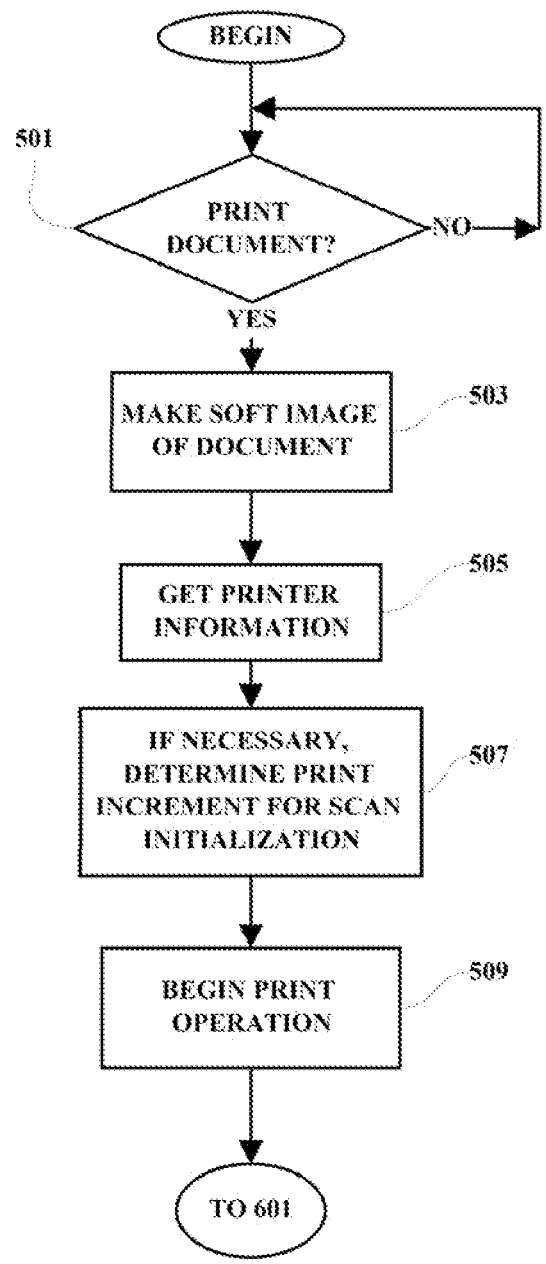
FIG. 5 is a flow chart illustrating an exemplary sequence of operations in one embodiment of the present invention.

FIG. 5 is a flow chart illustrating an exemplary sequence of operations in one embodiment of the present invention. As illustrated, when a printer begins a print job 501, which may be one or more pages, the printer makes a soft image 503 of the document to be printed. This "soft image" is a displayable image of the document in electronic form only and contains the content of the to-be printed document as it is supposed to be printed. This soft image information is stored and is accessible by the system to compare with and verify the actual document text as it is actually printed but before the entire document has been printed and is still within the printer. Next, the system gets the printer specifications 505 and other information necessary to determine what kind of printer is being used to do the print job. Next, a print increment is determined 507 depending on the kind of printer is being used. The print increment represents the amount of printing that needs to be completed before the scanning system can recognize it. In a print/scan common carrier printer, the increment is the distance between the print head and the scan head. In other printers, the increment may be, for example, a line of print before the scanning system can operate effectively. After getting the print increment, if necessary, to initialize the following scan operation, the print process is initiated 509.

Figure 6:
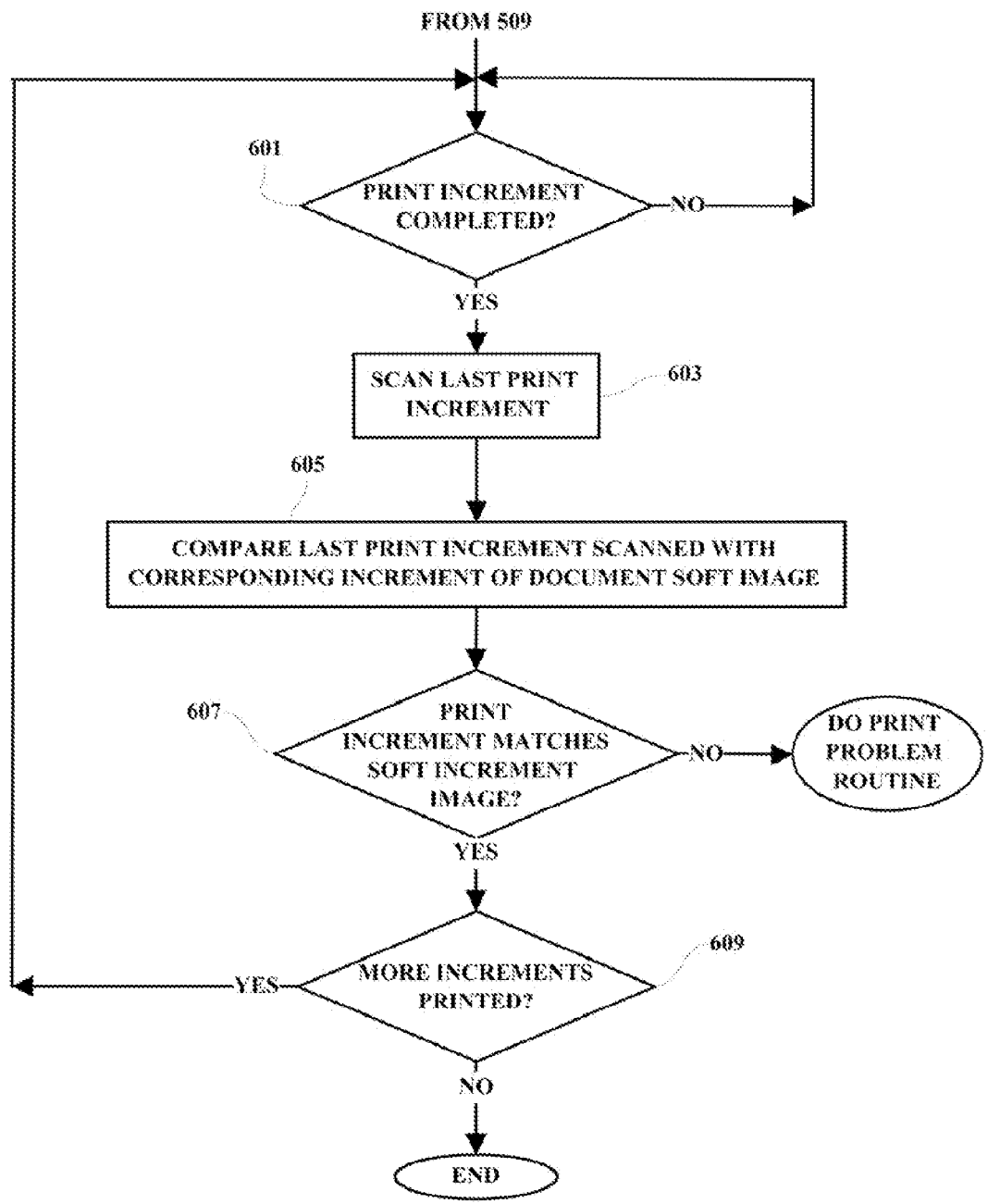
FIG. 6 is a continuation of the exemplary flow chart illustrated in FIG. 5.

As shown in FIG. 6, when the print increment has been completed 601, the scanning operation is initiated to scan the last printed increment 603. The scanned or actual image, i.e. the image produced as a result of the scan of the printed increment, is compared to the corresponding increment of the stored soft image 605 and a determination is made as to whether or not there is a match between the actual print as determined by the scan, and the corresponding increment of the soft image as determined by the stored electronic image of the document to be printed. If there is a match 607, the printed document increment has been printed as it should be and the system processing continues. If there are more increments to be printed 609, the system processing returns to block 601 to process and verify the next printed increment. If the actual scanned print increment does not match 607 the corresponding soft image increment, the processing continues by initiating a "print problem" routine as shown in FIG. 7.

Figure 7:
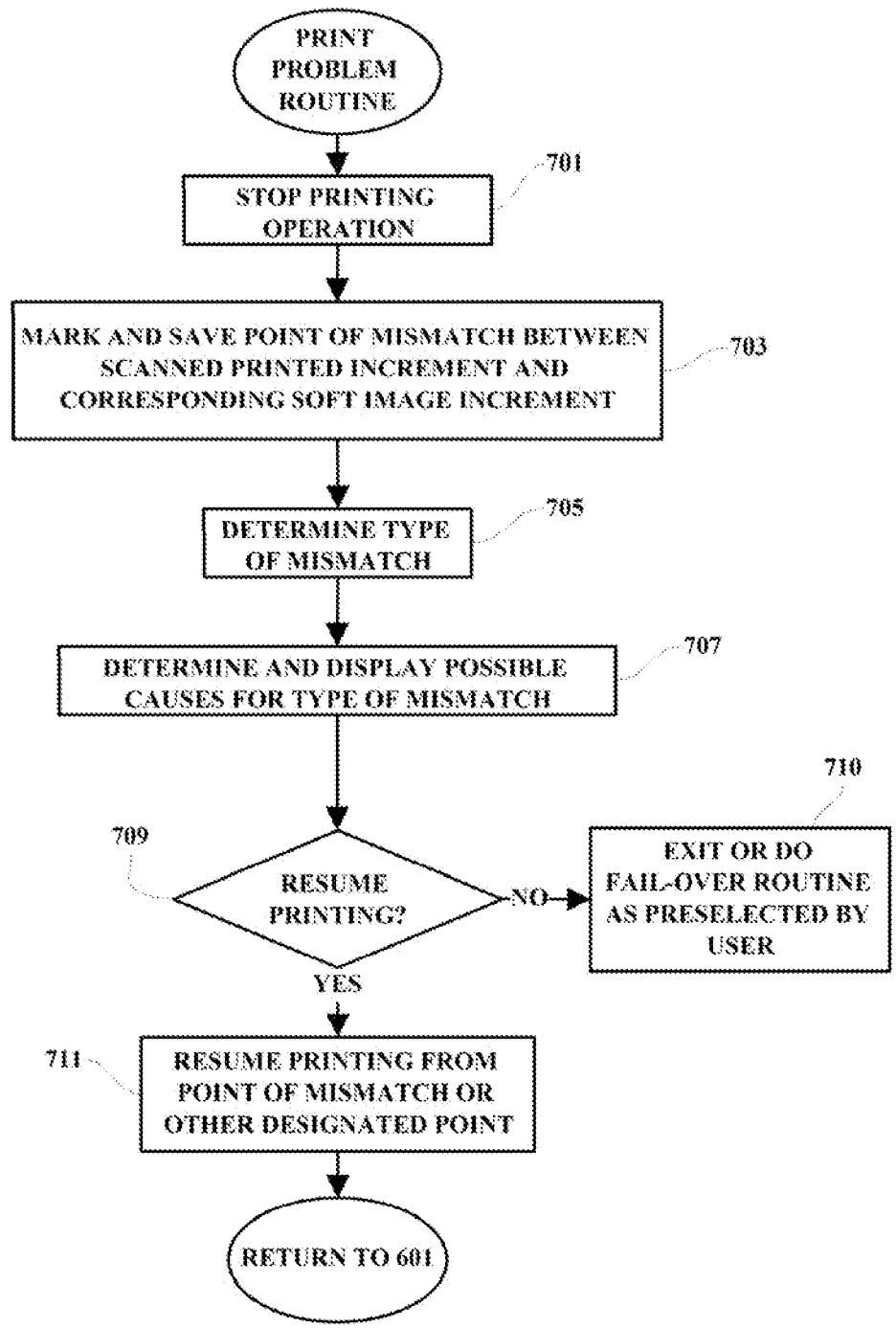
FIG. 7 is a continuation of the exemplary flow chart illustrated in FIG. 6.

In FIG. 7, immediately when a print problem is scanned and detected, such as shown at 213 in FIG. 2, the printing operation is stopped 701 even if the page being printed is still within the printing device. This avoids a continuation of a print job at the point of first fault rather than allowing a continuation of a print job which will produce unacceptable and/or unusable results. When the print operation is stopped 701, the fault point and the page being printed where there has been detected a mismatch between the scanned print image and the soft image is marked and saved 703 so that the process is enabled to return to that same point after the print problem has been identified and corrected. In some cases, the resumption of the printing may begin with beginning of the page of the first detected discrepancy rather than at the exact point but in either case the point where a discrepancy was first detected needs to be marked and saved. Next, the type of mismatch is determined 705 and possible causes for the mismatch or discrepancy are provided and displayed 707 to a user for possible corrective action. It is here noted that the system, in one embodiment, is enabled to receive a user input email address or other number at which the user may be reached such that if a discrepancy occurs in a print job, the user is able to receive notice of the failure and take appropriate action. If the user is able to resolve the printer problem, the system is arranged to respond to a "resume printing" operation 709 to resume printing from the point of detected discrepancy or mismatch, or other designated point such as the top of the page containing the detected discrepancy, and the processing continues by returning to block 601. If a user is unable to resolve the print problem and resume the printing 709, the system enables the user to exit the operation (without wasting further paper and ink) or to do a fail-over routine 710 as may be preselected by the user. For example, before initializing the print job, the user may be presented with a selection screen from which the user can select one or more back-up printers to which the print job may be routed for completion of the print job, either in whole or in part, in the event of a failure or malfunction of the designated primary printer.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a computer program product comprising a computer-readable, tangible storage device(s) and computer-readable program instructions stored on the computer-readable, tangible storage device(s) in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. As used herein, the term "media " does not include carrier signals or waves. The disclosed methodology may also be implemented using any available input and/or display systems including touch-sensitive screens and optically-sensitive input pads. Accordingly, the present invention is not intended to, be limited to the specific form set forth herein, but on the contrary, it is intended to cover such alternatives, modifications, and equivalents, as can be reasonably included within the spirit and scope of the invention.

What is claimed is:

1. A machine or software-implemented method for processing a printing of content on a page to be printed, said method comprising:
   printing said content on a page as said page passes through a first printing device;
   scanning printed content on said page after at least a portion of said content has been printed but before said page exits said first printing device to provide a scan image of said content as said content was actually printed by said first printing device;
   comparing said scan image to an electronically stored soft image of said content being printed;
   immediately stopping said printing at a fault point, said fault point being a point within said content where a mismatch is detected between said soft image and said scan image as a result of said comparing; and
   saving a location of said fault point where said mismatch was detected.

2. The method as set forth in claim 1 wherein said method further includes using said scan image to verify alignment of said content relative to predetermined data fields on said page.

3. The method as set forth in claim 1 and further including:
   providing notice to a user that said printing has been stopped; and
   providing selection means, said selection means being responsive to a user actuation for resuming said printing at said fault point, after said stopping.

4. The method as set forth in claim 1 and further including providing selection means, said selection means being responsive to a user actuation for resuming said printing beginning at a top of a page containing said fault point, after said stopping.

5. The method as set forth in claim 1 wherein said document content comprises text content.

6. The method as set forth in claim 1 wherein said document content comprises image content.

7. The method as set forth in claim 1 wherein said document content comprises both text and image content.

8. The method as set forth in claim 1 and further including;
   immediately stopping said printing at said fault point where a mismatch is detected between said soft image and said scan image as a result of said comparing: and
   displaying said scan image on a predetermined display device whereby a user is able to see an image of a print discrepancy causing said mismatch.

9. The method as set forth in claim 1 and further including:
   immediately stopping said printing at said first printing device at said fault point: and
   enabling said printing to be continued from said fault point, or from a page containing said fault point, at a predetermined second printing device.

10. A computer program product comprising a computer-readable, tangible storage device(s) and computer-readable program instructions stored on the computer-readable, tangible storage device(s) for processing a printing of content on a page to be printed, the computer-readable program instructions, when executed by a processing system, being operable for implementing a method comprising:
    printing said content on a page as said page passes through a first printing device;
    scanning printed content on said page after at least a portion of said content has been printed but before said page exits said first printing device to provide a scan image of said content as said content was actually printed by said first printing device;
    comparing said scan image to an electronically stored soft image of said content being printed;
    immediately stopping said printing at a fault point, said fault point being a point within said content where a mismatch is detected between said soft image and said scan image as a result of said comparing; and
    saving a location of said fault point where said mismatch was detected.

11. The computer pro gram product as set forth in claim 10 wherein said method further includes using said scan image to verify alignment of said content relative to predetermined data fields on said page to be printed.

12. The computer program product as set forth in claim 10 wherein said method further includes:
    providing notice to a user that said printing has been stopped; and
    providing selection means, said selection means being responsive to a user actuation for resuming said printing at said fault point, after said stopping.

13. The computer program product as set forth in claim 10 wherein said method further includes providing selection means, said selection means being responsive to a user actuation for resuming said printing beginning at a top of a page containing said fault point, after said stopping.

14. The computer program product as set forth in claim 10 wherein said method further includes:
    immediately stopping said printing at said fault point where a mismatch is detected between said soft image and said scan image as a result of said comparing: and
    displaying said scan image on a predetermined display device whereby a user is able to see an image of a print discrepancy causing said mismatch.

15. The computer program product as set forth in claim 10 wherein said method further includes:

immediately stopping said printing at said first printing device at said fault point: and enabling said printing to be continued from said fault point, or from a page containing said fault point, at a predetermined second printing device.

16. A printer device comprising:

a processing system coupled to a main bus system;

a storage system coupled to said main bus system;

system memory coupled to said main bus system;

a network access system coupled to said main bus system;

a display system coupled to said bus system;

a printing system coupled to said main bus system; and a scanning system coupled to said main bus system, said printer device being operable for providing a printed page by printing content on a page as said page passes through said printer device, said scanning system being operable for scanning said printed content on said page after at least a portion of said content has been printed but before said page exits said printing device to provide a scan image of said content as said content was actually printed by said printer device, said printer device further including means for comparing said scan image to an electronically stored soft image of said content being printed, said printer device being further operable for immediately stopping said printing at a fault point, said fault point being a point within said content where a mismatch is detected between said soft image and said scan image as a result of said comparing, said printer device further including means for providing notice on said display system to a user that said printing has been stopped, said printer device further including selection means responsive to a user actuation for resuming said printing at said fault point, after said stopping, or resuming said printing beginning at a top of a page containing said fault point, after said stopping, said printer device further including means for sending said scan image to a predetermined display device whereby a user is able to see an image of a print discrepancy causing said mismatch, said printer device further including means for enabling said printing to be continued from said fault point, or from a page containing said fault point, at a predetermined second printing device, wherein said content contains both text and image content.

* * * * *